United States Patent
Shuen

(10) Patent No.: US 6,243,977 B1
(45) Date of Patent: Jun. 12, 2001

(54) KNOCKDOWN LICENSE PLATE FRAME

(75) Inventor: Shun Tian Shuen, Taipei (TW)

(73) Assignee: Janchy Enterprise Co., Ltd., San Chung (TW)

( * ) Notice: Subject to any disclaimer, the term of this patent is extended or adjusted under 35 U.S.C. 154(b) by 0 days.

(21) Appl. No.: 09/335,489

(22) Filed: Jun. 18, 1999

(51) Int. Cl.[7] .................................................. G09F 7/00
(52) U.S. Cl. ............................ 40/200; 40/209; 40/206
(58) Field of Search ........................... 40/200, 209, 206, 40/780, 782, 785; D12/193

(56) References Cited

U.S. PATENT DOCUMENTS

| | | | |
|---|---|---|---|
| 578,200 | * 3/1897 | Bower | 40/780 |
| 1,857,141 | * 5/1932 | Corley | 40/209 |
| 1,913,000 | * 6/1933 | Woller | 40/209 |
| 1,983,614 | * 12/1934 | Kenny | 40/209 |
| 2,765,553 | * 10/1956 | Audette | 40/209 |
| 4,011,675 | * 3/1977 | Herring | 40/209 |
| 5,381,618 | * 1/1995 | Singleton | 40/209 X |
| 5,383,294 | * 1/1995 | Shen | 40/209 |
| 5,405,146 | * 4/1995 | Washington | 40/155 X |
| 5,477,628 | * 12/1995 | Chen | 40/155 |
| 5,638,623 | * 6/1997 | Shuen | 40/209 |
| 5,803,526 | * 9/1998 | Rohrberg | 40/209 X |

* cited by examiner

Primary Examiner—Anthony Knight
Assistant Examiner—James M Hewitt
(74) Attorney, Agent, or Firm—Bacon & Thomas, PLLC

(57) ABSTRACT

A knockdown license plate frame. The frame includes upper, lower, left and right members which can be freely assembled as desired in order to improve the appearance of a license plate of a motorcycle or a car.

4 Claims, 7 Drawing Sheets

KNOCKDOWN LICENSE PLATE FRAME

BACKGROUND OF THE INVENTION

1. Field of the Invention

The present invention relates to a knockdown license plate frame which can be freely assembled as desired by a user to embellish or decorate the license plate of a motorcycle or a car.

2. Description of the Related Art

A conventional license plate frame of a motorcycle or a car is generally made of a hard material and cannot easily be assembled or replaced as desired by a user.

SUMMARY OF THE INVENTION

It is therefore a primary object of the present invention to provide a knockdown license plate frame including an upper member, a lower member, a left member and a right member which are formed with various profiles and stripes and can be freely assembled as desired by a user. The upper and lower members are symmetrical to each other and the left and right members are symmetrical to each other. The license plate frame serves to beautify the license plate of a motorcycle or a car.

BRIEF DESCRIPTION OF THE DRAWINGS

The present invention can be best understood through the following description and accompanying drawings wherein.

DETAILED DESCRIPTION OF THE PREFERRED EMBODIMENTS

Figure 1:
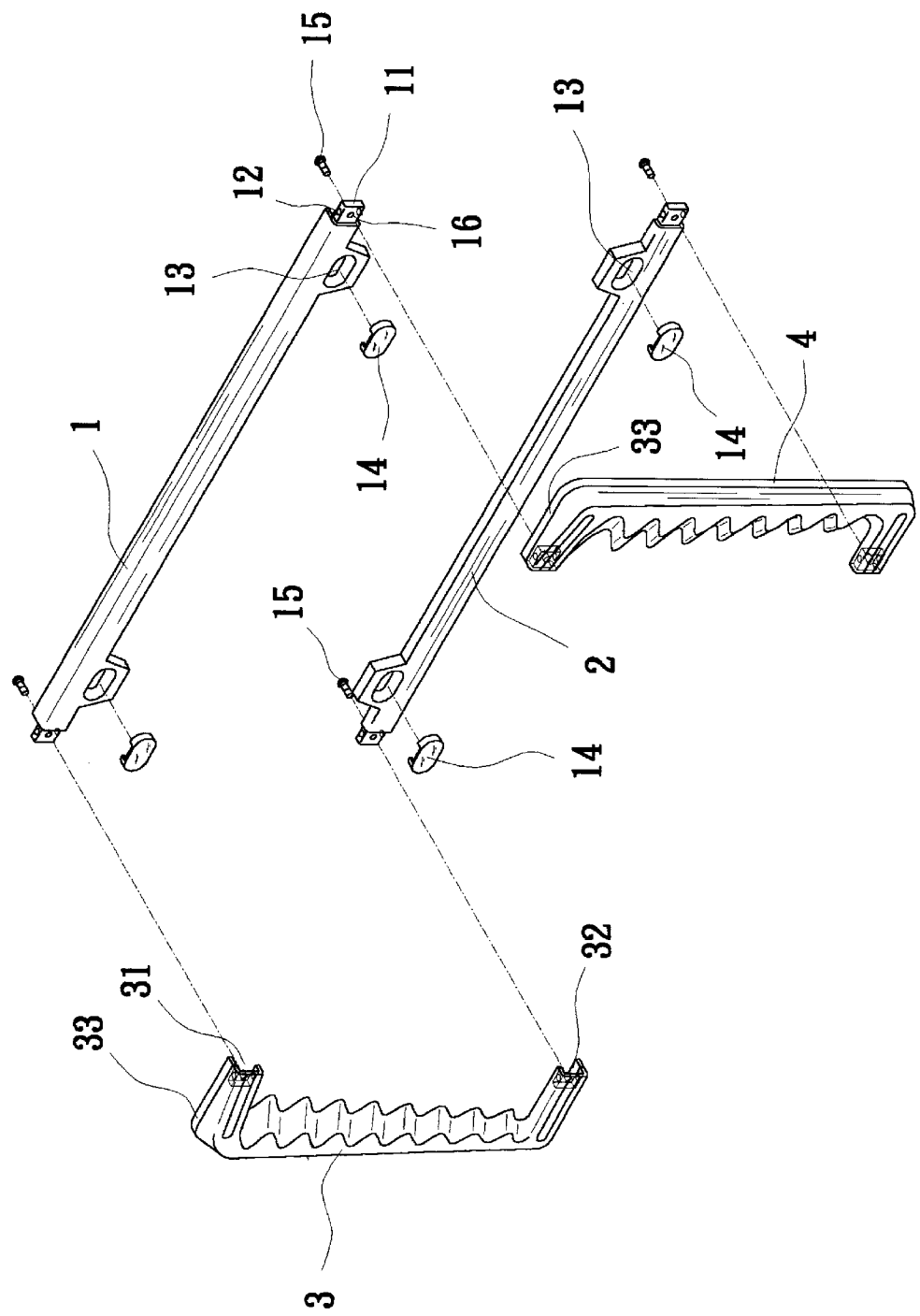
FIG. 1 is a perspective exploded view of the license plate frame of the present invention.
Figure 2:
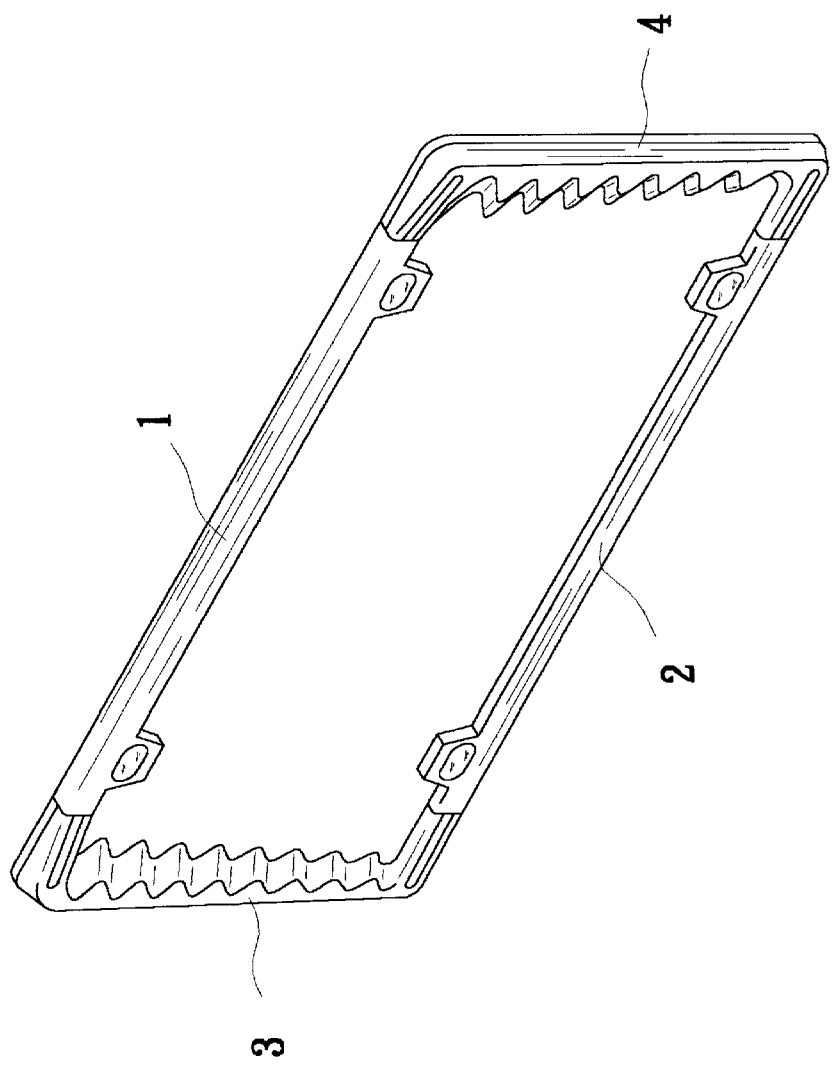
FIG. 2 is a perspective assembled view of the license plate frame of the present invention.

Please refer to FIGS. 1 and 2. The present invention includes an upper member 1, a lower member 2, a left member 3 and a right member 4.

The upper member 1 is an elongated strip. Each end of the upper member 1 is formed with an insertion section 11 projecting from the end. The insertion section 11 is a rectangular solid body formed with an insertion hole 16 on one side and a protuberance 12 on an opposite side. Accordingly, when inserted with the left and right members 3, 4, a firmly and quickly engaging effect is achieved. In addition, each side of the upper member 1 is formed with a lug having a locking hole 13 and a corresponding cover plate 14 for covering the locking hole 13.

The lower member 2 is also an elongated strip similar to the upper member 1. The only difference resides in that the lower member 2 is formed with locking holes 13 in a direction reverse to those of the upper member 1.

The left member 3 is a U-shaped member. Two free ends of the left member 3 are formed with insertion sockets 31. The inner side of the insertion socket 31 near the center is disposed with a projecting insertion post 32 for inserting into the insertion hole 16 of the insertion section 11. A screw 15 is passed through the insertion hole 16 to screw with the insertion post 32.

The left and right members 3, 4 include edge portions 33 that protrude to protect the insertion sections 11, as shown in FIG. 1.

The right member 4 has a structure identical to that of the left member 3.

Figure 3:
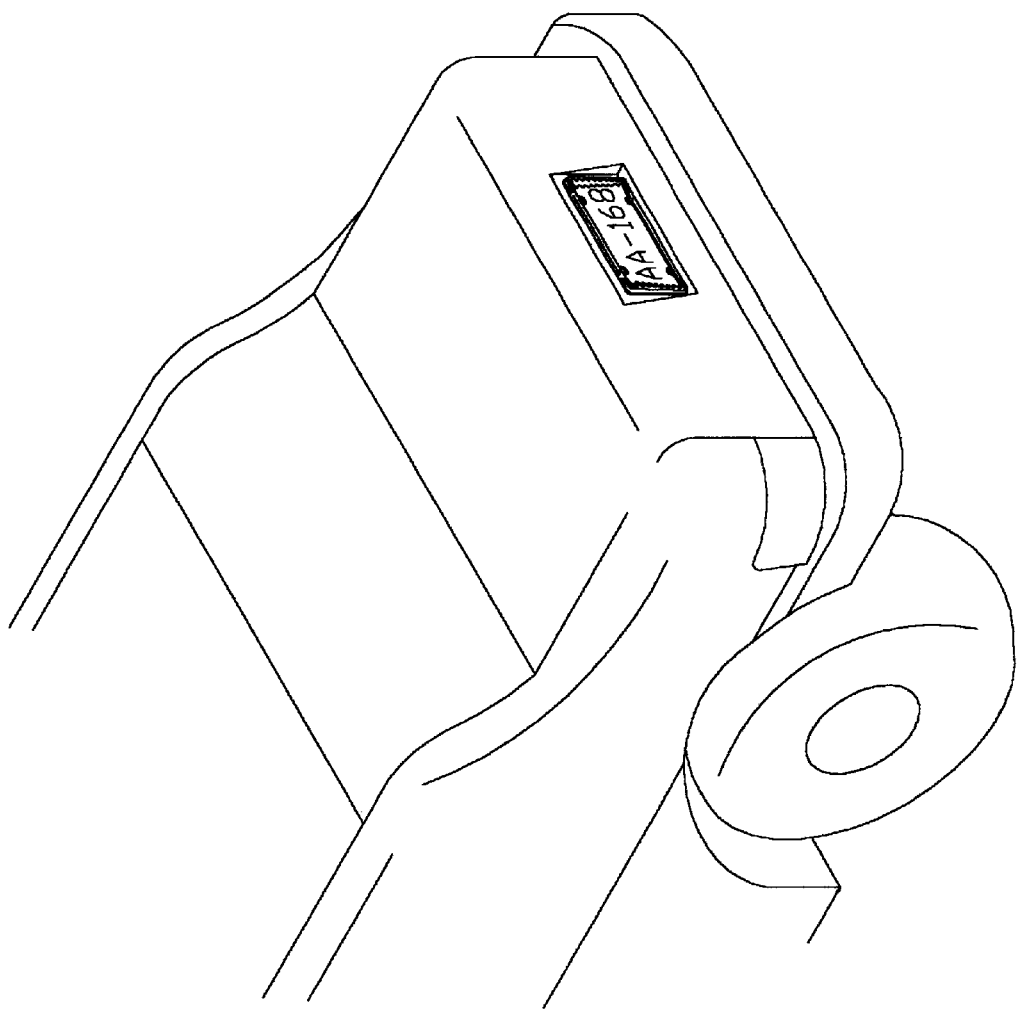
FIG. 3 shows the application of the license plate frame of the present invention to a license plate of a car.
Figure 4:
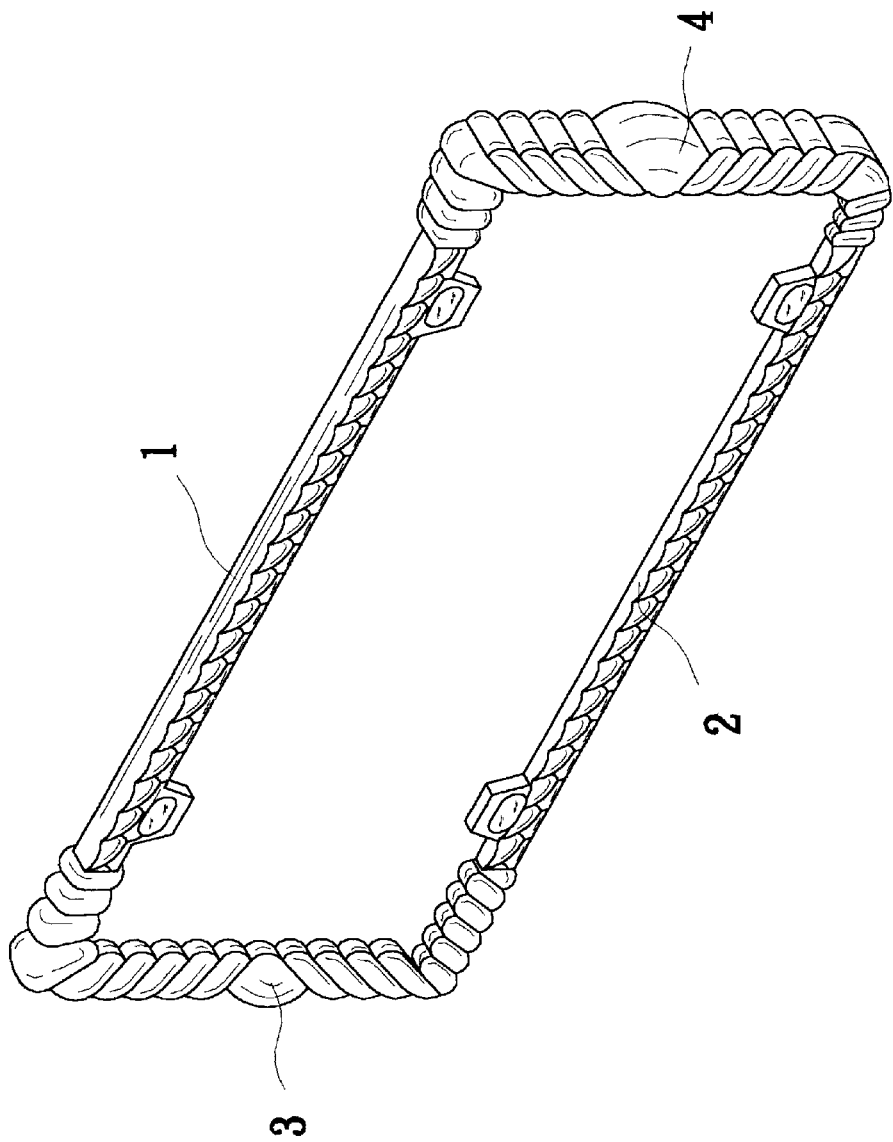
FIG. 4 is a perspective view showing an embodiment of the license plate frame of the present invention.
Figure 5:
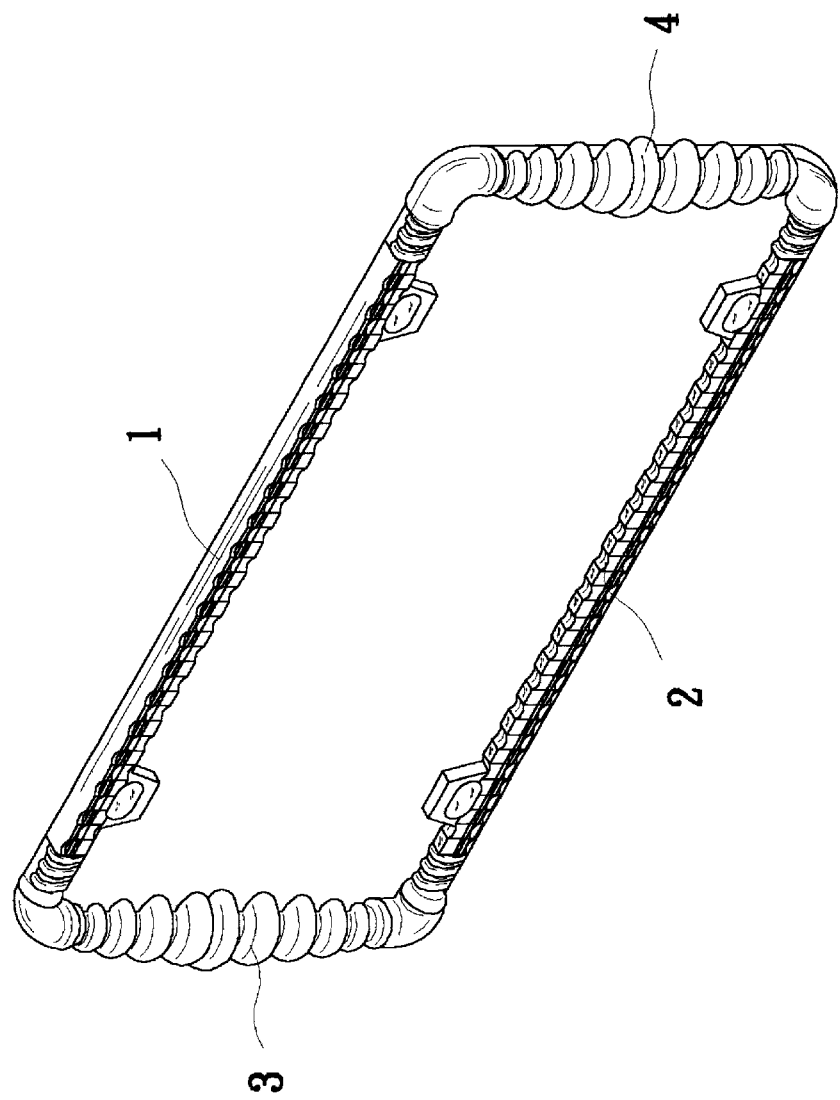
FIG. 5 is a perspective view showing another embodiment of the license plate frame of the present invention.
Figure 6:
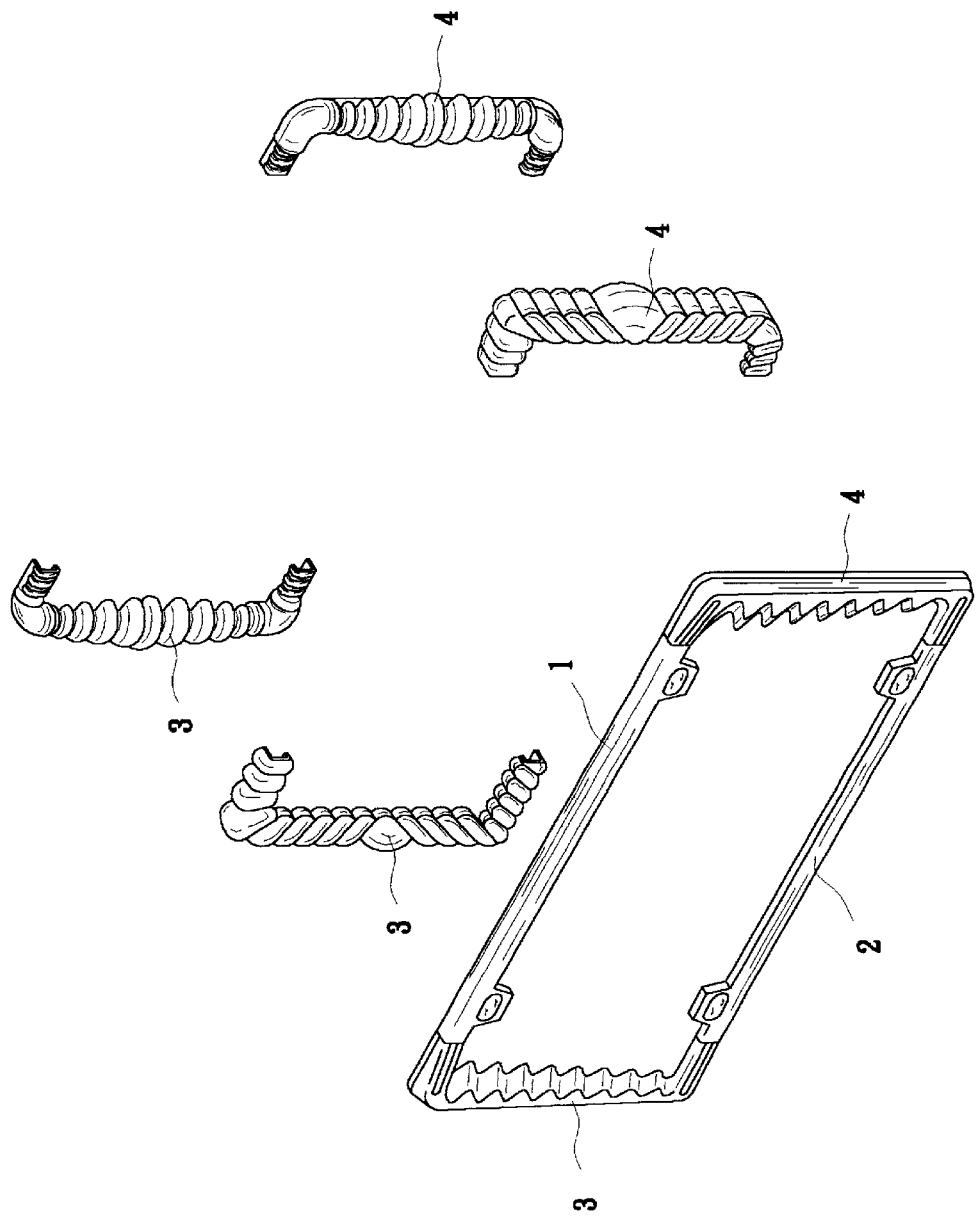
FIG. 6 is a perspective view showing still another embodiment of the license plate frame of the present invention.
Figure 8:
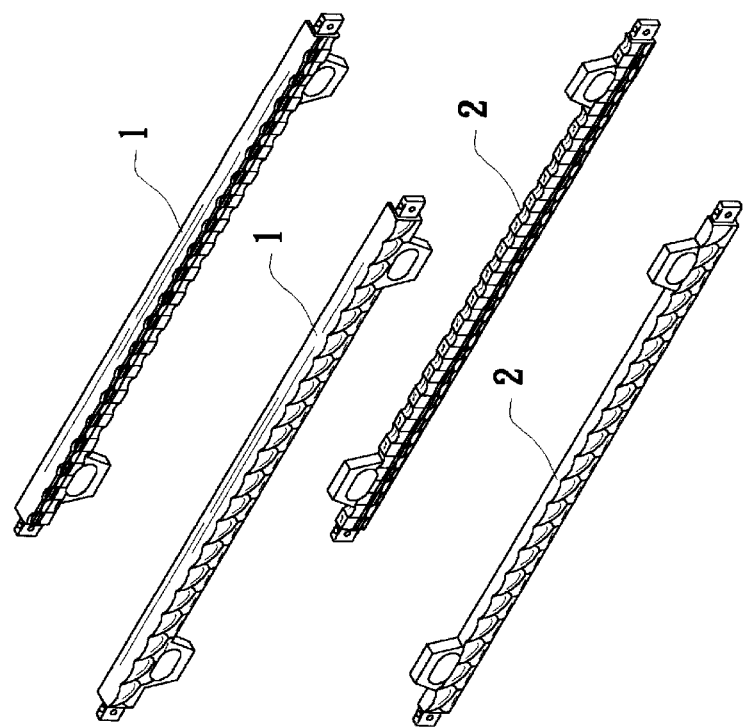
FIG. 8 is a perspective view of various upper and lower members that can be used in the present invention.
Figure 7:
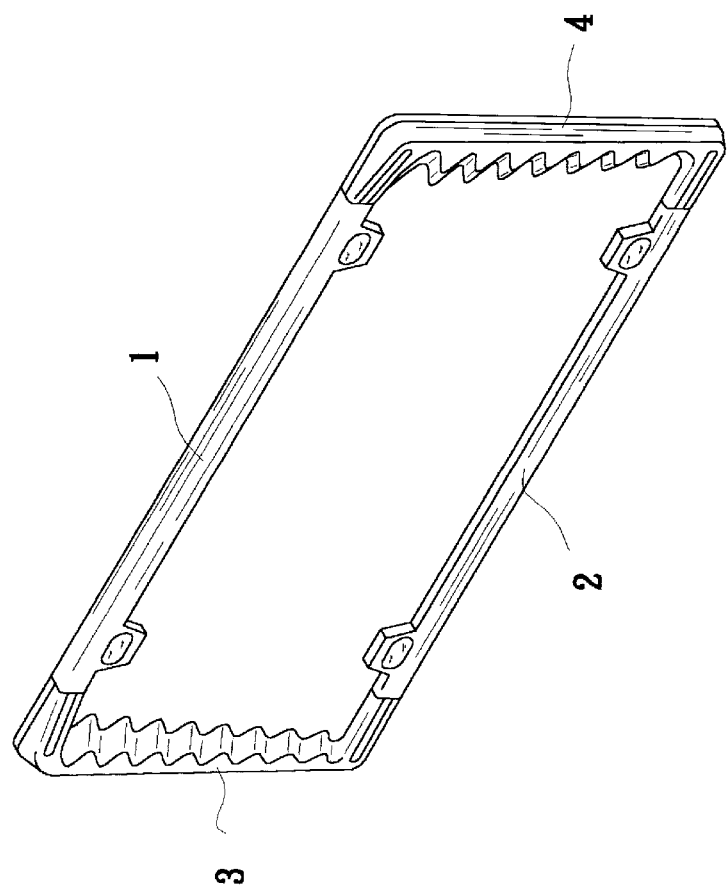
FIG. 7 is a perspective view showing still another embodiment of the license plate frame of the present invention.

Referring to FIG. 3, the license plate frame of the present invention is mounted around the license plate of a motorcycle or a car to beautify or embellish the license plate. The license plate frame can be freely replaced as desired.

FIGS. 4 to 7 respectively show several embodiments of the present invention. It can be known from the drawings that the upper, lower, left and right members 1, 2, 3 and 4 can be freely assembled as desired in many variations.

When assembled, the upper or lower member 1, 2 is first assembled with the left or right member 3, 4 and then the entire body is assembled.

The above embodiments are only used to illustrate the present invention, not intended to limit the scope thereof. Many modifications of the above embodiments can be made without departing from the spirit of the present invention.

What is claimed is:

1. A knockdown license plate frame comprising:

an upper member, a lower member, a left member and a right member, each of the upper and lower members is an elongated strip, each end of the upper and lower members being formed with an insertion section projecting from the end, thereof the insertion section being a rectangular solid body formed with an insertion hole on one side and a protuberance on an adjacent side, whereby when inserted with the left and right members, a firmly and quickly engaging effect is achieved, a side of each of the upper and lower members being formed with a lug having a locking hole, the left member being a U-shaped member, two free ends of the left member comprising insertion sockets, a projecting insertion post disposed on and extending from an inner side of each of the insertion sockets near the center of the sockets for inserting into the insertion hole of the insertion section, the right member having a structure identical to that of the left member; and fastening devices inserted through each the insertion holes and engaged to the insertion posts to secure the members of the license plate frame together.

2. The knockdown license plate frame as recited in claim 1 wherein said fastening devices are screws.

3. The knockdown license plate frame as recited in claim 1, wherein the upper and lower members each comprise two of the lugs.

4. The knockdown license plate frame as recited in claim 3, wherein each of the locking holes of the lugs is covered by a cover plate.

* * * * *